United States Patent [19]
Tsunoda et al.

[11] Patent Number: 6,081,991
[45] Date of Patent: Jul. 4, 2000

[54] MANUFACTURING METHOD OF MAGNETIC HEAD APPARATUS

[75] Inventors: Atsuyoshi Tsunoda; Masao Yamaguchi; Noboru Kanzo; Takumi Takano, all of Nagano, Japan

[73] Assignee: TDK Corporation

[21] Appl. No.: 09/150,732

[22] Filed: Sep. 10, 1998

[30] Foreign Application Priority Data

Sep. 12, 1997 [JP] Japan ..................................... 9-265153

[51] Int. Cl.$^7$ ....................................................... G11B 5/42
[52] U.S. Cl. .................... 29/603.08; 29/603.2; 29/603.15
[58] Field of Search ............................ 29/603.12, 603.15, 29/603.16, 603.17, 603.18, 603.08

[56] References Cited

U.S. PATENT DOCUMENTS

| | | |
|---|---|---|
| 4,564,584 | 1/1986 | Fredericks et al. . |
| 5,329,689 | 7/1994 | Azuma et al. ............................. 29/603 |
| 5,718,035 | 2/1998 | Yamanaka et al. .................... 29/603.1 |
| 5,722,156 | 3/1998 | Balfrey et al. ....................... 29/603.08 |

FOREIGN PATENT DOCUMENTS

| | | |
|---|---|---|
| 63-191309 | 8/1988 | Japan . |
| 3-295017 | 12/1991 | Japan . |
| 4-134717 | 5/1992 | Japan . |

Primary Examiner—Carl E. Hall
Attorney, Agent, or Firm—Arent Fox Kintner Plotkin & Kahn, PLLC

[57] ABSTRACT

A method of manufacturing a magnetic head apparatus provided with a slider having an ABS includes a step of aging a bar with a plurality of sliders, a step of lapping a surface or the bar, the surface including the ABS to be formed, the lapping step including a final lapping process for finally lapping the surface of the bar, a step of forming rails of the respective sliders of the bar after the final lapping process, the forming step including a photolithographic etching process to form the rails, and a step of cutting the bar to separate into the individual sliders. The aging step is carried out before the final lapping process or with the final lapping process.

7 Claims, 7 Drawing Sheets

MANUFACTURING METHOD OF MAGNETIC HEAD APPARATUS

FIELD OF THE INVENTION

The present invention relates to a method of manufacturing a floating type magnetic head apparatus having a slider with an air bearing surface (ABS).

DESCRIPTION OF THE RELATED ART

As for slider working processes in fabricating a floating type magnetic head, the following processes are the most typical. First, a wafer on which a large number of magnetic transducer elements are formed in matrix is cut to divide into bars (head slider blocks) on each of which a plurality of sliders are arranged in one row or rows. Then, after each of the bars is adhered to a working jig, the ABS of the bar is ground to form rails. Thereafter, the bar which is being adhered to the jig is cut in order to separate into individual slider pieces, and then the rail surfaces of the pieces are lapped to finish the ABSs. After that, the individual slider pieces are detached from the jig.

However, in a magnetic head such as a magnetoresistive effect (MR) type head for a recent high recording density disk drive, the rails cannot be formed by the above-mentioned grinding process, since the rails with the ABSs have often a complicated shape such as a negative pressure air bearing (NPAB) shape. Thus, the rails and negative air pressure generating portion are formed by an etching process using a photolithography technique as described in for example U.S. Pat. No. 4,564,584.

In such NPAB shape magnetic head, an ultra low flying height (floating amount) of 20 to 60 nm is required. Therefore, in order to ensure accuracy of the flying height, it is necessary to accurately fabricate not only the ABS height but also the rail depth or the depth of the negative generating portion. Accordingly, it is required to keep fine flatness of the ABS which is a base surface.

Manufacturing methods of magnetic heads for enhancing the flatness of the ABS are known from, for example, Japanese Unexamined Patent Publication Nos. 63(1988)-191309, 3(1991)-295017 and 4(1992)-134717. Each of these known methods includes the steps of grinding a bar which is being adhered to a work jig to form a concave portion therein, thereby forming rails, after aging cutting the bar into slider pieces which are still adhered to the jig, the slider pieces in the state that they are adhered to the jig, lapping the rail surface to finish the ABS, and then removing the individual slider pieces from the jig.

According to these known methods, since an internal stress of the slider piece is relieved by the aging process, flatness of the ABS of the slider piece can be obtained to some extent. In the known method, however, the lapping process of the ABSs is carried out under the condition where although the slider pieces are still adhered to the jig, they have been already cut into individual ones. Accordingly, each of the slider pieces easily moves by stress given from its side direction due to the lapping process causing that it is difficult to keep flatness of the ABS in high level.

SUMMARY OF THE INVENTION

It is, therefore, an object of the present invention to provide a method of manufacturing a magnetic head apparatus in which a high level of flatness of the ABS can be maintained in forming rails and a negative pressure generating portion, and consequently, accurately miniaturized and complicated shaped rails and negative pressure generating portion can be formed.

According to the present invention, a method of manufacturing a magnetic head apparatus provided with a slider having an ABS includes a step of aging a bar with a plurality of sliders, a step of lapping a surface of the bar, the surface including the ABS to be formed, the lapping step including a final lapping process for finally lapping the surface of the bar, a step of forming rails of the respective sliders of the bar after the final lapping process, the forming step including a photolithographic etching process to form the rails, and a step of cutting the bar to separate into the individual sliders. The aging step is carried out before the final lapping process or with the final lapping process.

The aging process for relieving the internal stress of a bar is carried out before the final lapping process and/or upon the final lapping process. After that, rails and a negative pressure generating portion of the respective sliders are formed. Thus, the lapping process accompanied with the aging process is carried out before the formation of the rails and negative pressure generating portion.

Accordingly, in the formation of the rails and negative pressure generating portion, the bar has already been relieved from its internal remaining strain and the internal stress of adhesive, whereby the ABS with a high level flatness can be expected. As a result, since a high accurate NPAB shape can be formed, a magnetic head that can provide ultra low flying height be obtained. Additionally, since the lapping process with the aging process is carried out in a bar state, deformation of bar and position shift do not occur easily, whereby high level flatness of the ABS can be also ensured.

It is preferred that the etching process includes a patterning process of the rails using a resist film.

It is also preferred that the etching process is a dry etching process.

In an embodiment according to the present invention, the lapping process includes only the final lapping process, or the lapping process includes a plurality of lapping processes including the final lapping process.

According to the present invention, also, a method of manufacturing a magnetic head apparatus provided with a slider having an ABS includes a step of lapping a surface of a bar with a plurality of sliders, the surface including the air bearing surface to be formed, a step of aging the lapped bar with heat, a step of finally lapping the surface of the aged bar, the surface including the air bearing surface to be formed, a step of forming rails of the respective sliders of the bar after the finally lapping step, the forming step including a photolithographic etching process to form the rails, and a step of cutting the bar to separate into the individual sliders.

Furthermore, according to the present invention, a method of manufacturing a magnetic head apparatus provided with a slider having an ABS includes a step of lapping a surface of a bar with a plurality of sliders, the surface including the air bearing surface to be formed, a step of aging the lapped bar with heat and finally lapping the surface of the bar, the surface including the air bearing surface to be formed, a step of forming rails of the respective spiders of the bar after the aging and finally lapping step, the forming step including a photolithographic etching process to form the rails, and a step of cutting the bar to separate into the individual sliders.

Further objects and advantages of the present invention will be apparent from the following description of the preferred embodiments of the invention as illustrated in the accompanying drawings.

DESCRIPTION OF THE PREFERRED EMBODIMENTS

Figure 1:
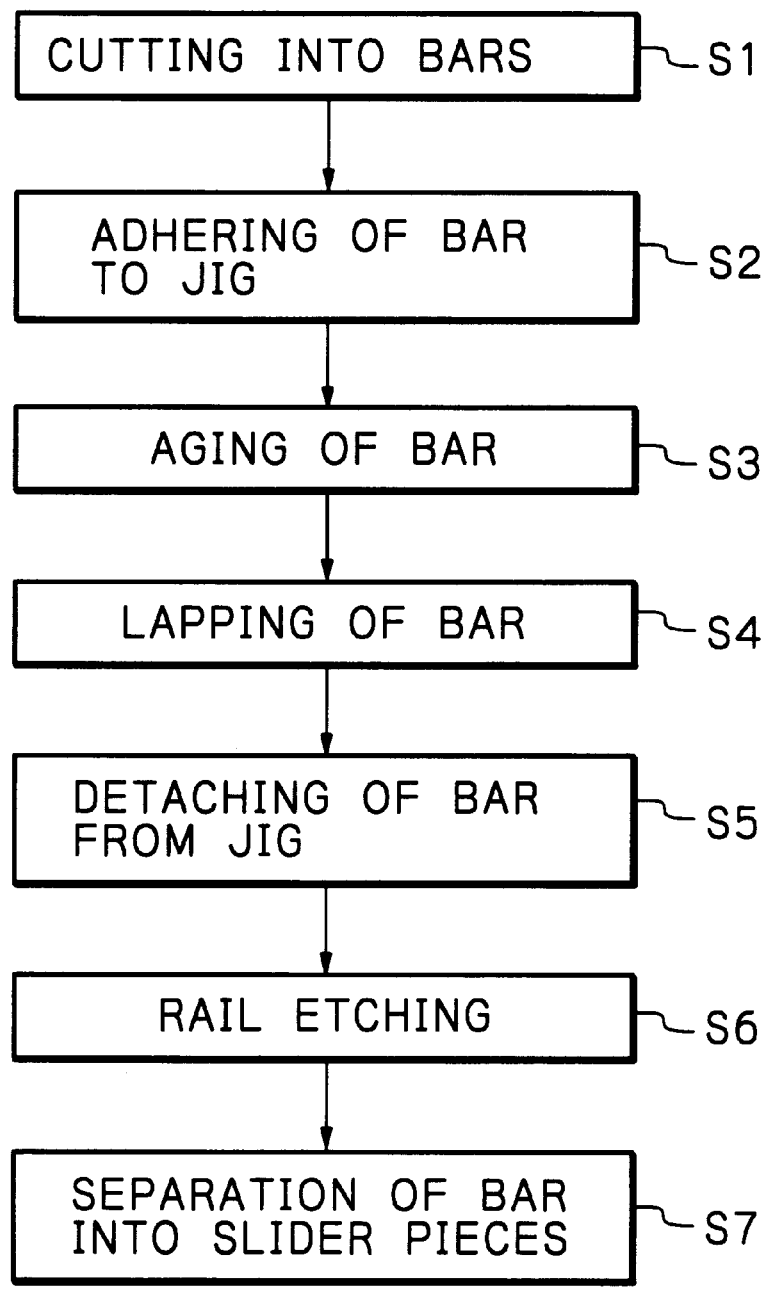
FIG. 1 is a flow chart schematically illustrating each process in a preferred embodiment of the manufacturing method according to the present invention.
Figure 2:
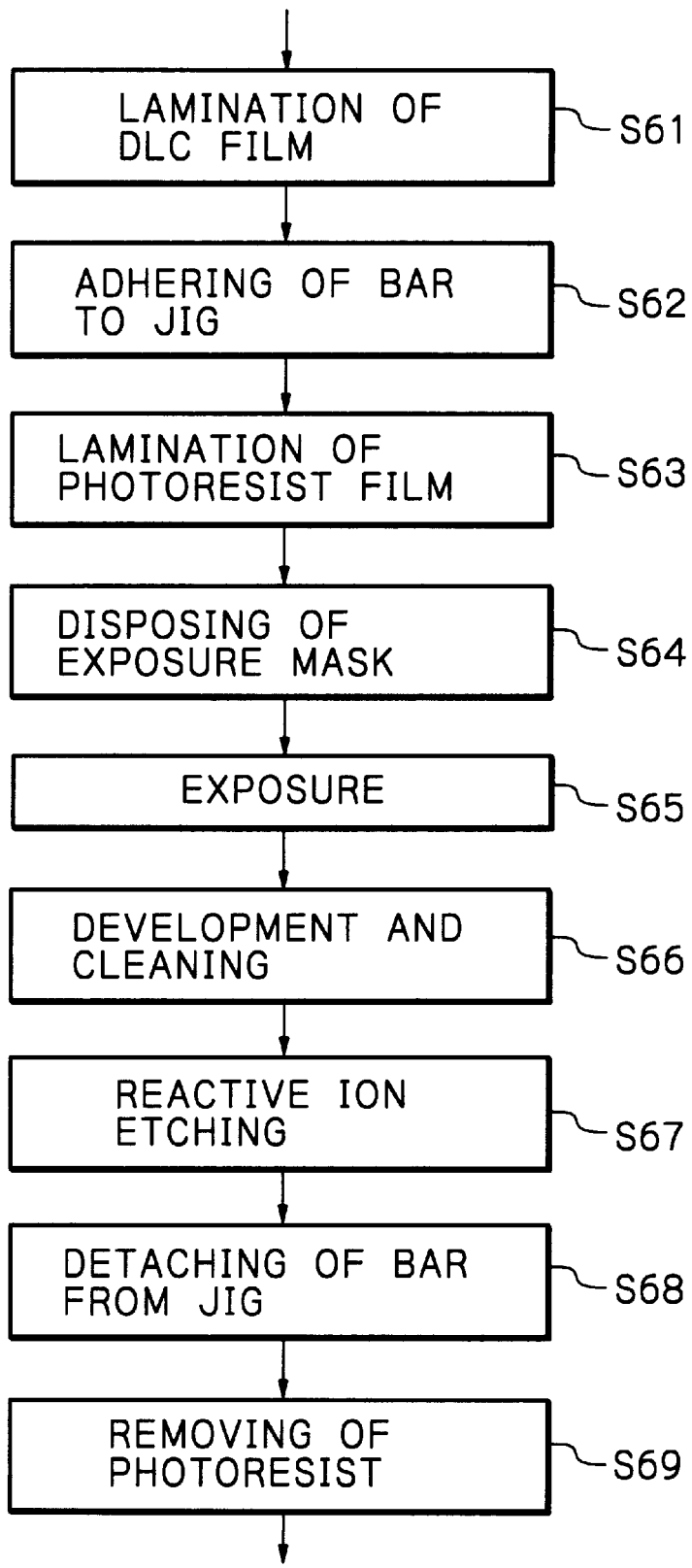
FIG. 2 is a flow chart illustrating details of a rail etching process shown in FIG. 1.

FIG. 1 schematically illustrates respective processes in a preferred embodiment of the manufacturing method according to the present invention, and FIG. 2 illustrates the detail of a rail etching process shown in FIG. 1.

Figure 3:
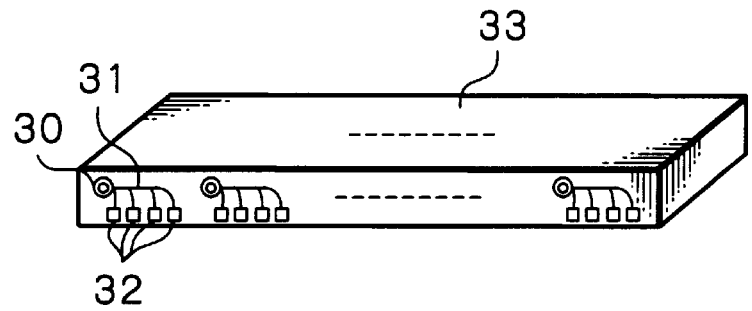
FIG. 3 is a perspective view illustrating a bar cut off from a wafer in the embodiment of FIG. 1.

First, a wafer (not shown) on which a large number of magnetic transducer elements, leads and input/output terminals are formed in matrix is cut to divide into bars (head slider blocks) 33 one of which is shown in FIG. 3. Thus, each of the bars on which a plurality of sliders each having a magnetic transducer element 30, leads 31 and input/output terminals 32 are arranged in one raw is cut out (step S1 of FIG. 1).

Figure 4:
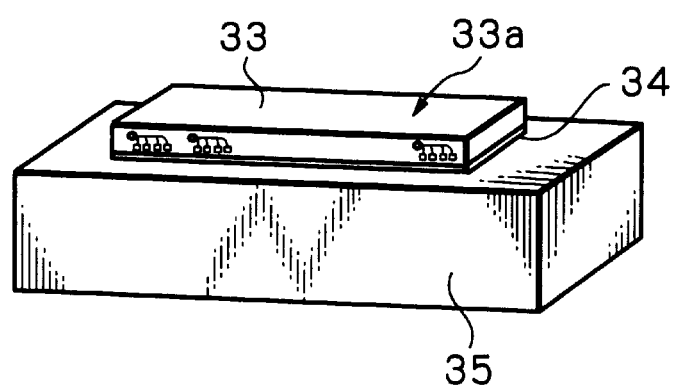
FIG. 4 is a perspective view illustrating the bar adhered to a working jig in the embodiment of FIG. 1.
Figure 5:
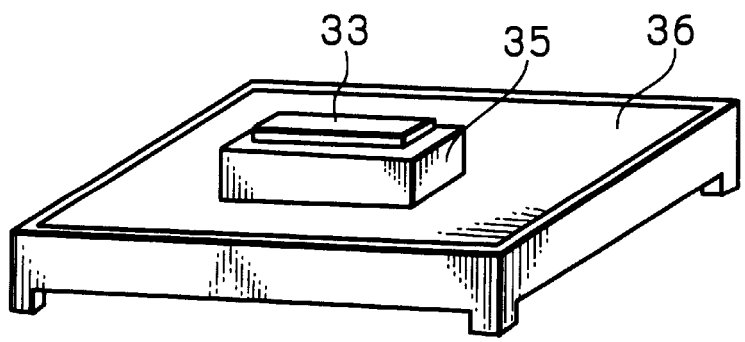
FIG. 5 is a perspective view illustrating an aging process for the bar in the embodiment of FIG. 1.

After that, as shown in FIG. 4, each of the bars 33 is adhered to a working jig 35 with an adhesive 34 having softening properties when heated (step S2). In this case, the bar 33 is adhered to the jig 35 so that a surface 33a of the bar 33, which will become an ABS, is oriented upward from the jig 35.

An aging process is then carried out, for example, by heating the jig 35 with the bar 33 disposed on a hot plate 36 (step S3). By this heating, the bar 33 can be relieved from its inherent strain and from the strain due to the internal stress of the adhesive 34. The aging temperature is basically a temperature lower than the softening point of the adhesive resin used. It is preferred that tile aging temperature is 30 to 100° C., more preferably 30 to 50° C., and the most preferably 40° C. The aging period of time of is preferably 1 to 10 hours, and more preferably 1 to 3 hours. The heating of the bar may be executed by using an oven other than the above-mentioned hot plate.

Figure 6:
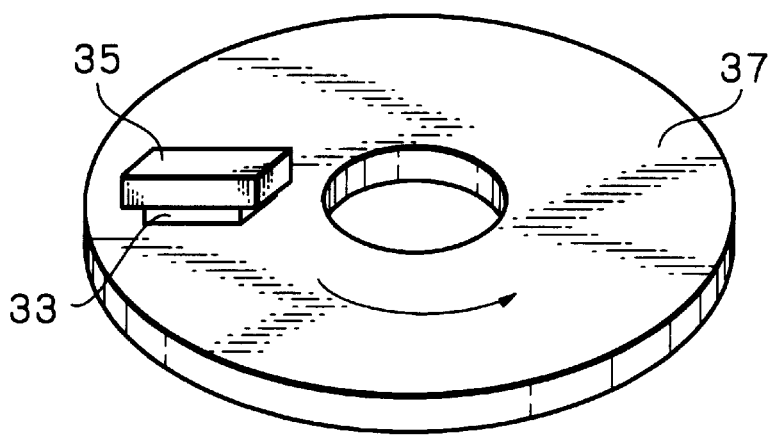
FIG. 6 is a perspective view illustrating a lapping process for the bar in the embodiment of FIG. 1.

After the aging process, a lapping process as shown in FIG. 6 is carried out by pressing the surface 33a of the bar 33 against a rotating lapping member 37 (step S4). The tapping member 37 is composed of a soft metallic material such as tin or the like and abrasive diamond grains. As another lapping member, a ceramic member can be also used. By the lapping process (step S4) following the aging process (step S3), the lapping will be executed in a situation relieved from the internal strain of the bar 33 itself and from the strain due to the internal stress of the adhesive 34. Accordingly, flatness of the ABS can be kept at a very high level.

After the lapping process has completed, the bar 33 is detached from the jig 35 (step S5) and a rail etching process (step S6) including an etching process using a photolithography technique is then carried out.

Figure 7:
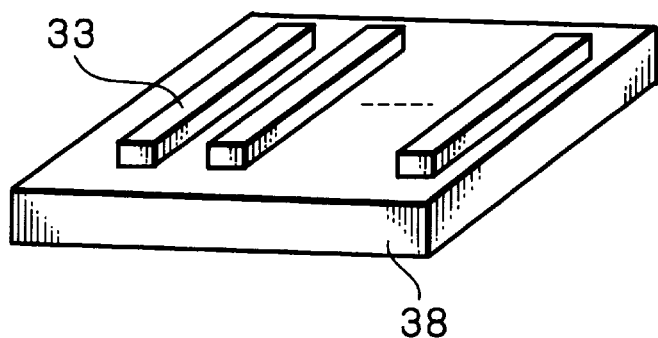
FIG. 7 is a perspective view illustrating the bars in the embodiment of FIG. 1 adhered to a jig for the rail etching process.

In this rail etching process, a diamond like carbon (DLC) film is first laminated to cover the surface 33a of the bar 33 (step S61 in FIG. 2). Then, as shown in FIG. 7, a plurality of bars 33 are adhered to a working jig 38 used for only the rail etching process (step S62). In this case, the bars 33 are adhered to the jig 38 in a manner that variations in the heights of ABSs of the bars 33 are 10 µm or less.

Figure 8:
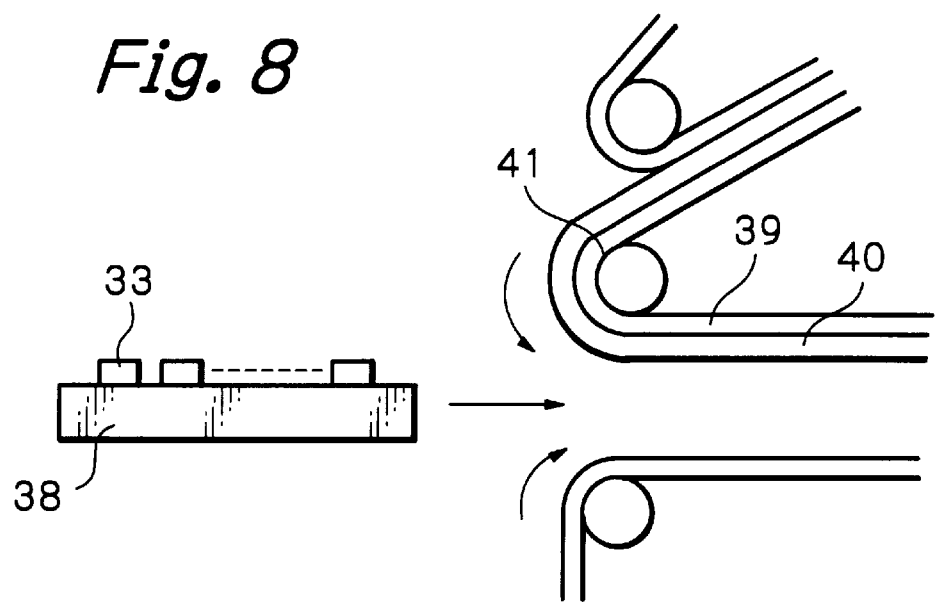
FIG. 8 is a view illustrating a process for laminating a photoresist film to the surface of bars in the embodiment of FIG. 1.

Then, a dry film with 20 to 30 µm thickness is laminated on the surfaces of the ABSs 33a of bars 33 adhered on the jig 38 to form a negative type photoresist film covering the surfaces for the ABSs (step S63). In this lamination process of the photoresist film, as shown in FIG. 8, an organic photoresist film 40 supported by a flexible film 39 such as polyethylene terephtalate is transferred on the surfaces for the ABSs 33a under heat and pressure using a heated roller 41. In this case, if the surfaces for the ABSs have no high level flatness, a wrinkle or wrinkles may be easily generated in the photoresist film 40 causing that high accurate patterning cannot be expected. In this embodiment, however, since the flatness of the surfaces for the ABSs are maintained to a very high level due to the aging process (step S3) and the following lapping process (step S4), accurate patterning can be carried out.

Then, an exposure mask (not shown) is disposed on the photoresist film (step S64) and exposure is executed (step S65). After that, unexposed portions of the photoresist film are etched by an alkaline developing solution so as to remove these portions (step S66), thereby completing the patterning.

Figure 9:
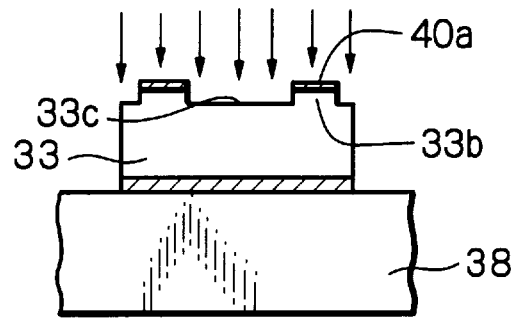
FIG. 9 is a cross-sectional view illustrating the rail etching process in the embodiment of FIG. 1.

Then, as shown in FIG. 9, ion milling, such as reactive ion etching, is executed to the surface for the ABS with the remaining patterned resist film 40a to form rail portions 33b and a negative pressure generating portions 33c (step 67). In order to control the etching depths within a standardized tolerance of 3 µm±0.09 µm which will be required in the near future, the surface for the ABS is required to have a high level flatness. In this embodiment, by the aging process (step S3) and the following lapping process (step S4), since the flatness of the surface for the ABS can be kept at a very high level, the etching depths can be controlled within the above-mentioned tolerance.

Each of the bars 33 is then detached from the jig 38 (step 68) and the remaining resist films are removed by a solvent such as acetone (step S69).

After the above-mentioned rail etching process (step SC) in FIG. 1) has been completed, the bar 33 is cut by machining to separate into individual slider pieces (step S7).

Figure 10:
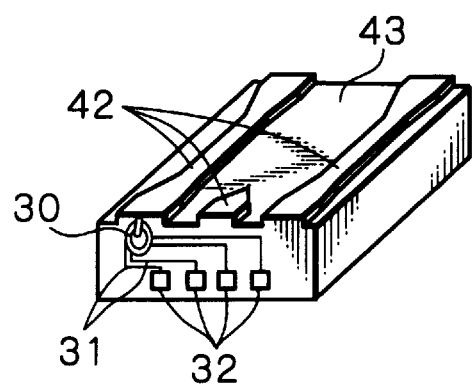
FIG. 10 is a perspective view illustrating an example of a slider piece formed according to the embodiment of FIG. 1.

FIG. 10 illustrates an example of thus formed slider piece having rails with each miniaturized and complicated shape of micron order or less, such as NPAB shape etc. In FIG. 10, reference numeral 42 denotes ABSs of such miniaturized, complicated shaped rail, 43 denotes a negative pressure generating portion, 30 denotes a magnetic transducer element, 31 denotes leads and 32 denotes input/output terminals.

As aforementioned, in this embodiment, the aging process for relieving the internal stress of the bar is carried out before the tapping process, and the rails and the negative pressure generating portion of each slider are then formed. Thus, since the lapping process accompanied with the aging process is carried out before the formation of the rails and the negative pressure generating portion, the bar has already been relieved from its internal remaining strain and internal stress or the adhesive when the rails and the negative pressure generating portion are formed. Therefore, flatness of the ABS can be kept at a high level. As a result, an accurate rail having a miniaturized and complicated shape of micron order or less, such as NPAB shape can be formed. Accordingly, a magnetic head which can stabbly provide an ultra low flying height can be obtained. As for a concrete example, the flatness of the ABS finally obtained when the lapping process and the rail etching process are carried out without an aging process before the lapping process is 4.6 nm in a standard deviation σ of its twist value. Whereas, according to this embodiment, the flatness of the ABS finally obtained when the rail etching process are carried out with the aging process helpful for flattening the ABS of the bar executed before the lapping process is 2.0 nm or less in a standard deviation σ of its twist value.

Furthermore, since according to this embodiment, the lapping process accompanied with the aging process is carried out in still a bar state, bar deformation and position shift during the lapping process are difficult to occur, whereby high level flatness of the ABS can be ensured. As for a concrete example, the flatness of the ABS finally obtained when the lapping process accompanied with the aging process are carried out after separating the bar into slider pieces and then the rail etching process is carried out, is 10 to 20 nm in a standard deviation σ of its twist value. Whereas, according to this embodiment, the flatness of the ABS finally obtained when the rail etching process is carried out after the lapping processes accompanied with the aging process in a bar state is 2.0 nm or less in a standard deviation σ of its twist value.

Figure 11A:
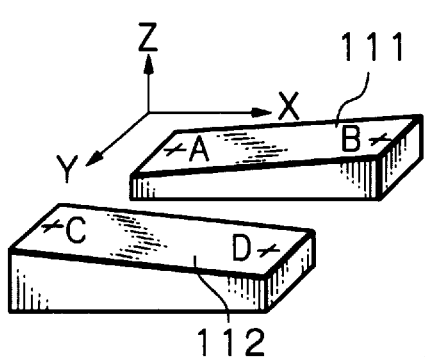
Figs. 11a and 11b are a view for explaining the concept of a twist value.
Figure 11B:
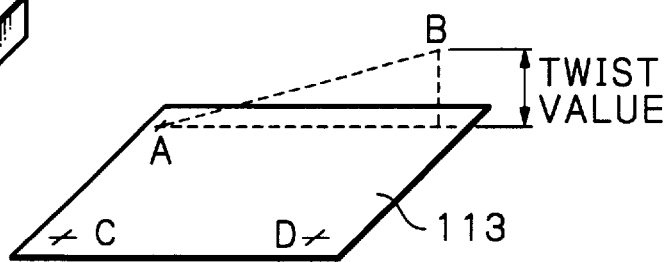

The above-mentioned twist value which represents flatness will now be briefly explained. The respective least square planes of two rails 111 and 112 of a slider shown in FIG. 11a are calculated and then four points A to D are determined. In this case, the points A and B are points of given positions near both edges in the calculated least square plane of the rail 111. On the other hand, the points C and D are points of given positions near both edges in the calculated least square plane of the rail 112. As shown in FIG. 11b, distance between a plane including the thus determined points A, C and D and the determined point B corresponds to a twist value. If the point B is positioned on the positive side of the Z axis with respect to the plane 113, the twist value is positive, otherwise the twist value is negative. The measurement of the twist value can be performed by an instrument "LFT10B" produced by Tokyo Seimitsu Co., Ltd.

Figure 12:
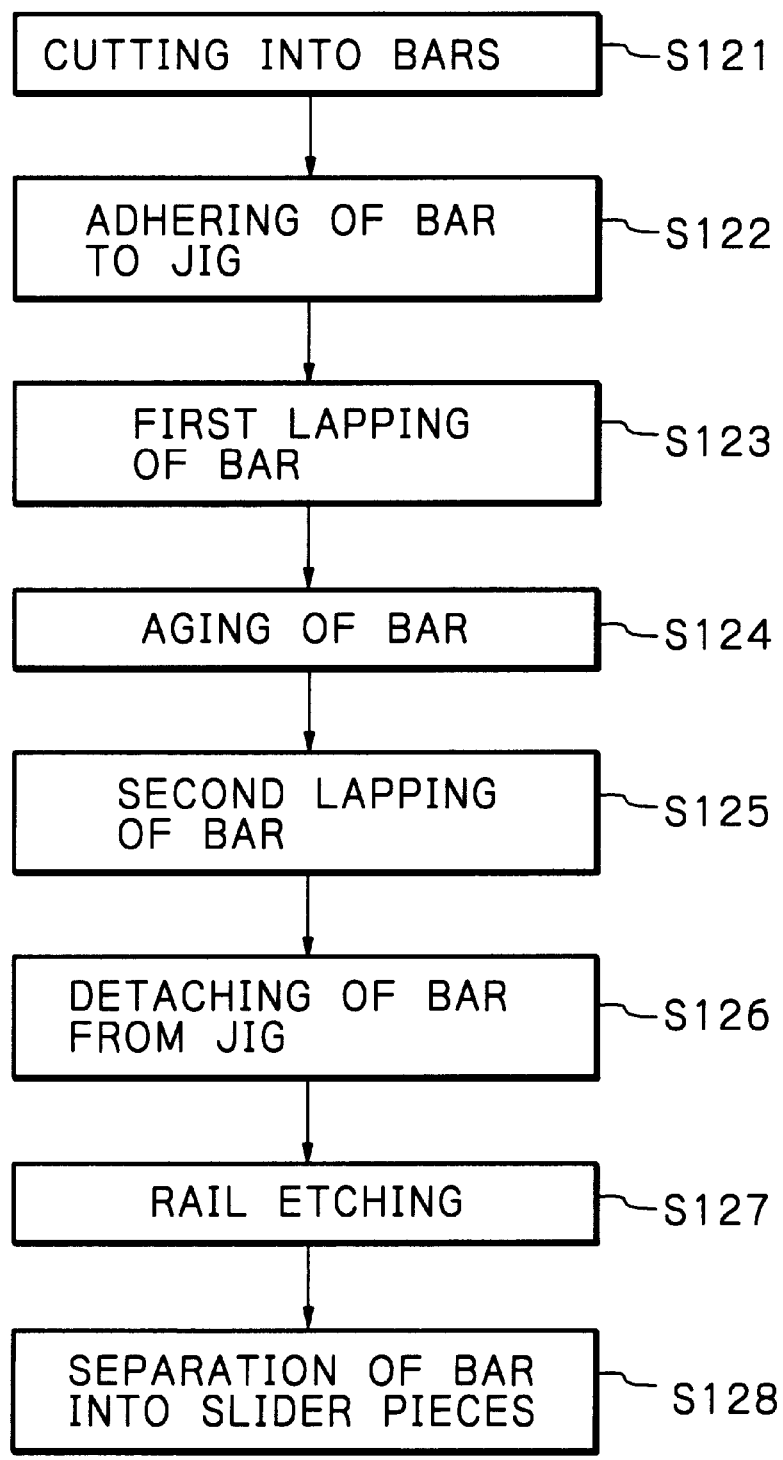
FIG. 12 is a flow chart schematically illustrating each process in another embodiment of the manufacturing method according to the present invention.

FIG. 12 schematically illustrates each process in another embodiment of a manufacturing method according to the present invention. As for the same processes as in the embodiment of FIG. 1, the same drawings and reference numerals are used.

First, a wafer (not shown) on which a large number of magnetic transducer elements, leads and input/output terminals are formed in matrix is cut to divide into bars 33 one of which is shown in FIG. 3. Thus, each of the bars on which a plurality of sliders each having a magnetic transducer element 30, leads 31 and input/output terminals 32 are arranged in one raw is cut out (step S121).

After that, as shown in FIG. 4, each of the bars 33 is adhered to a working jig 35 with an adhesive 34 having softening properties when heated (step S122). In this case, the bar 33 is adhered to the jig 35 so that a surface 33a of the bar 33, which will become an ABS, is oriented upward from the jig 35.

Then, as shown in FIG. 6, a first lapping process for the bar 33 is carried out (step S123). This lapping process is a comparatively rough lapping process, and is carried out by pressing the surface 33a of the bar 33 against a rotating lapping member 37. The lapping member 37 is composed of a soft metallic material such as tin or the like and abrasive diamond grains. As another lapping member a ceramic member can the also used.

An aging process is then carried out, for example, by heating the jig 35 with the bar 33 disposed on a hot plate 36 (step S124). By this heating, the bar 33 can be relieved from its inherent strain and From the strain due to the internal stress of the adhesive 34. The aging temperature is basically a temperature lower than the softening point of the adhesive resin used. It is preferred that the aging temperature is 30 to 100° C. , more preferably 30 to 50° C. , and the most preferably 40° C. The aging period of time of is preferably 1 to 10 hours, and more preferably 1 to 3 hours. The heating of the 2 bar may be executed by using an oven other than the above-mentioned hot plate.

After the aging process, a second lapping process is carried out (step S125). This lapping process is a comparatively fine lapping process, and is carried out by pressing the surface 33a of the bar 33 against a rotating lapping member 37. The lapping member 37 is composed of a soft metallic material such as tin or the like and abrasive diamond grains. As another lapping member, a ceramic member can be also used. By the second lapping process (step S125) following the aging process (step S124), the lapping will be executed in a situation relieved from the internal strain of the bar 33 itself and from the strain due to the internal stress of the adhesive 34. Accordingly, flatness of the ABS can be kept at a very high level.

After the second lapping process has completed, the bar 33 is detached from the jig 35 (step S126) and a next rail etching process (step S127) is then carried out. Since this rail etching process is the same as in the etching process explained with FIG. 2 in the embodiment of FIG. 1, the detailed explanation is omitted.

After the above-mentioned rail etching process, the bar 33 is cut by machining to separate into individual slider pieces (step S128).

As aforementioned, in this embodiment, the aging process for relieving the internal stress of the bar is carried out before the second lapping process, and the rails and the negative pressure generating portion of each slider are then formed. Thus, since the lapping processes accompanied with the aging process are carried out before the formation of the rails and the negative pressure generating portion, the bar has already been relieved from its internal remaining strain and internal stress of the adhesive when the rails and the negative pressure generating portion are formed. Therefore, flatness of the ABS can be kept at a high level. As a result, an accurate rail having a miniaturized and complicated shape of micron order or less, such as NPAB shape can be formed. Accordingly, a magnetic head which can stably provide an ultra low flying height can be obtained. As for concrete examples, measured twist values representing flatness of the ABS finally obtained when the lapping process and the rail etching process are carried out without an aging process before the lapping process, and of the ABS finally obtained when the rail etching process are carried out with the aging process before the second lapping process are shown in following Tables 1 and 2. Table 1 is a case of this embodiment in which before the second lapping process, the aging process for relieving the internal stress of bars is carried out and the rail etching process is then carried out. Table 2 is a case in which the lapping process is carried out without an aging process, and a rail etching process is then carried out. In this case, the number of samples is 100.

TABLE 1

|  | AFTER FIRST LAPPING | AFTER AGING | AFTER SECOND LAPPING | AFTER DETACHING BAR | AFTER RAIL ETCHING | AFTER SEPARATING INTO SLIDER PIECES |
|---|---|---|---|---|---|---|
| AVERAGE VALUE [nm] | −0.3 | −0.2 | −0.2 | −0.9 | −1.4 | −1.6 |
| STANDARD DEVIATION σ [nm] | 1.2 | 4.5 | 0.8 | 1.4 | 0.8 | 1.9 |

TABLE 2

|  | AFTER LAPPING | AFTER DETACHING BAR | AFTER RAIL ETCHING | AFTER SEPARATING INTO SLIDER PIECES |
|---|---|---|---|---|
| AVERAGE VALUE [nm] | −0.4 | −0.5 | −1.8 | −2.3 |
| STANDARD DEVIATION σ [nm] | 1.3 | 5.0 | 3.3 | 4.6 |

Furthermore, since according to this embodiment, the lapping process accompanied with the aging process is carried out still a bar state, bar deformation and position shift during the lapping process are difficult to occur, whereby high level flatness of the ABS can be ensured. As for a concrete example, the flatness of the ABS finally obtained when the lapping process accompanied with the aging process are carried out after separating the bar into slider pieces and then the rail etching process is carried out, is 10 to 20 nm in a standard deviation σ of its twist value. Whereas, according to this embodiment, the flatness of the ABS finally obtained when the rail etching process is carried out after the lapping processes accompanied with the aging process in a bar state is 2.0 nm or less in a standard deviation σ of its twist value.

Figure 13:
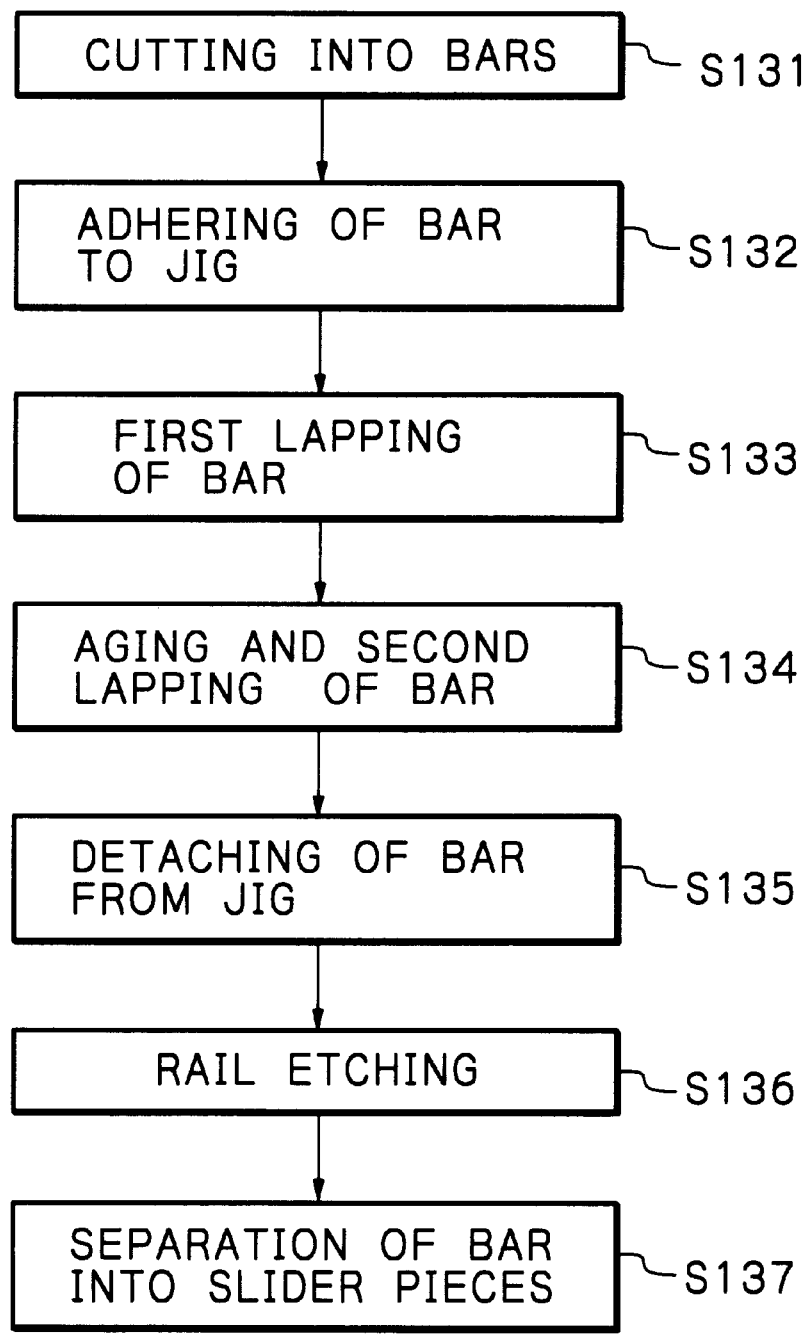
FIG. 13 is a flow chart schematically illustrating each process in still another embodiment of the manufacturing method according to the present invention.

FIG. 13 schematically illustrates each process in still another embodiment of a manufacturing method according to the present invention. As for the same processes as in the embodiment of FIG. 1, the same drawings and reference numerals are used.

First, a wafer (not shown) on which a large number of magnetic transducer elements, leads and input/output terminals are formed in matrix is cut to divide into bars 33 one of which is shown in FIG. 3. Thus, each of the bars on which a plurality of sliders each having a magnetic transducer element 30, leads 31 and input/output terminals 32 are arranged in one raw is cut out (step S131).

After that, as shown in FIG. 4, each of the bars 33 is adhered to a working jig 35 with an adhesive 34 having softening properties when heated (step S132). In this case, the bar 33 is adhered to the jig 35 so that a surface 33a of the bar 33, which will become an ABS, is oriented upward from the jig 35.

Then, as shown in FIG. 6, a first lapping process for the bar 33 is carried out (step S133). This lapping process is a comparatively rough lapping process, and is carried out by pressing the surface 33a of the bar 33 against a rotating lapping member 37. The tapping member 37 is composed of a soft metallic material such as tin or the like and abrasive diamond grains. As another flapping member a ceramic member can be also used.

Then, an aging and second lapping processes are simultaneously carried out (step S134). In this step, for example, the surface 33a of the bar 33 is pressed against a rotating lapping member 37 while the jig 35 with the bar 33 disposed on a hot plate 36 is heated. By the heating, the bar 33 can be relieved from its inherent strain and from the strain due to the internal stress of the adhesive 34. The aging temperature is basically a temperature lower than the softening point of the adhesive resin used. It is preferred that the aging temperature is 30 to 100° C., more preferably 30 to 50° C., and the most preferably 40° C. The aging period of time of is preferably 1 to 10 hours, and more preferably 1 to 3 hours. The heating of the bar may be executed by using an oven other than the above-mentioned hot plate. The lapping process is a comparatively fine lapping process. The lapping member 37 is composed of a soft metallic material such as tin or the like and abrasive diamond grains. As another lapping member, a ceramic member can be also used. By simultaneously executing the aging and the second lapping processes, the lapping will be executed in a situation relieved from the internal strain of the bar 33 itself and from the strain due to the internal stress of the adhesive 34. Accordingly, flatness of the A135 can be kept at a very high level. In addition, thanks for the simultaneous execution of the both processes, a process period of time can be shortened.

After the aging and second lapping processes have completed, the bar 33 is detached from the jig 35 (step S135) and a next rail etching process (step S136) is then carried out. Since this rail etching process is the same as in the etching process explained with FIG. 2 in the embodiment of FIG. 1, the detailed explanation is omitted.

After the above-mentioned rail etching process, the bar 33 is cut by machining to separate into individual slider pieces (step S137).

As aforementioned, in this embodiment, the aging process for relieving the internal stress of the bar and the second lapping process are simultaneously carried out, and the rails and the negative pressure generating portion of each slider are then formed. Thus, since the lapping processes accompanied with the aging process are carried out before the formation of the rails and the negative pressure generating portion, the bar has already been relieved from its internal remaining strain and internal stress of the adhesive when the rails and the negative pressure generating portion are formed. Therefore, flatness of the ABS can be kept at a high level. As a result, an accurate rail having a miniaturized and complicated shape of micron order or less, such as NPAB shape can be formed. Accordingly, a magnetic head which can stably provide an ultra low flying height can be obtained. As for a concrete example, the flatness of the ABS finally obtained when the lapping process and the rail etching process are carried out without an aging process before the lapping process is 4.6 nm in a standard deviation σ of its twist value. Whereas, according to this embodiment, the flatness of the ABS finally obtained when the rail etching process are carried out after the aging process helpful for flattening the ABS of the bar and the lapping process is 2.0 nm or less in a standard deviation σ of its twist value.

Furthermore, since according to this embodiment, the lapping process accompanied with the aging process is carried out in still a bar state, bar deformation and position shift during the lapping process are difficult to occur, whereby high level flatness of the ABS can be ensured. As for a concrete example, the flatness of the ABS finally obtained when the lapping process accompanied with the aging process are carried out after separating the bar into slider pieces and then the rail etching process is carried out, is 10 to 20 nm in a standard deviation σ of its twist value. Whereas, according to this embodiment, the flatness of the ABS finally obtained when the rail etching process is carried out after the lapping processes accompanied with the aging process in a bar state is 2.0 nm or less in a standard deviation σ of its twist value.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method of manufacturing a magnetic head provided with a slider having an air bearing surface comprising the steps of:

aging a bar with a plurality of sliders;

lapping a surface of the aged bar including the air bearing surface, said lapping step including a final lapping step that finally laps said surface of the aged bar;

forming rails of the respective sliders on the aged bar after the final lapping step, said forming step including a photolithographic etching process that forms said rails; and cutting the aged bar into individual sliders, said aging step being carried out one of either before said final lapping step on during said final lapping step.

2. The method as claimed in claim 1, wherein said etching process includes a patterning process of said rails using a resist film.

3. The method as claimed in claim 1, wherein said etching process is a dry etching process.

4. The method as claimed in claim 1, wherein said lapping process includes only said final lapping process.

5. The method as claimed in claim 1, wherein said lapping step includes a plurality of lapping steps, including said final lapping step.

6. A method of manufacturing a magnetic head apparatus provided with a slider having an air bearing surface comprising the steps of:

lapping a surface of a bar with a plurality of sliders, said surface including the air bearing surface to be formed;

aging the lapped bar with heat;

finally lapping the surface of the aged bar, said surface including the air bearing surface to be formed;

forming rails of the respective sliders of the bar after said finally lapping step, said forming step including a photolithographic etching process to form said rails; and cutting the bar to separate into the individual sliders.

7. A method of manufacturing a magnetic head apparatus provided with a slider having an air bearing surface comprising the steps of:

lapping a surface of a bar with a plurality of sliders, said surface including the air bearing surface to be formed;

aging the lapped bar with heat and finally lapping the surface of the bar, said surface including the air bearing surface to be formed;

forming rails of the respective sliders of the bar after said aging and finally lapping step, said forming step including a photolithographic etching process to form said rails; and cutting the bar to separate into the individual sliders.

* * * * *